US010055209B2

(12) United States Patent
Eliáš et al.

(10) Patent No.: US 10,055,209 B2
(45) Date of Patent: Aug. 21, 2018

(54) RESOURCE CLOSING

(71) Applicant: Red Hat, Inc., Raleigh, NC (US)

(72) Inventors: Filip Eliáš, Brno (CZ); Filip Nguyen, Brno (CZ)

(73) Assignee: RED HAT, INC., Raleigh, NC (US)

( * ) Notice: Subject to any disclaimer, the term of this patent is extended or adjusted under 35 U.S.C. 154(b) by 159 days.

(21) Appl. No.: 14/594,623

(22) Filed: Jan. 12, 2015

(65) Prior Publication Data

US 2016/0202956 A1 Jul. 14, 2016

(51) Int. Cl.
*G06F 11/36* (2006.01)
*G06F 17/30* (2006.01)
(Continued)

(52) U.S. Cl.
CPC ............. *G06F 8/443* (2013.01); *G06F 8/51* (2013.01); *G06F 9/45516* (2013.01);
(Continued)

(58) Field of Classification Search
CPC . G06F 8/447; G06F 8/71; G06F 8/316; G06F 8/30; G06F 9/4812; G06F 9/4428; G06F 11/3696; G06F 11/008; G06F 11/079; G06F 11/0793; G06F 11/3636; G06F 11/3612; G06F 11/3608; G06F 8/41; G06F 17/30371; G06F 17/30058; G06F 9/5016; G06F 9/524; G06F 8/52; G06F 8/4432; G06F 8/72; G06F 8/33; G06F 8/4441; G06F 8/433; G06F 8/77; G06F 8/443; G06F 17/30; G06F 17/30348; G06F 17/30424;
(Continued)

(56) References Cited

U.S. PATENT DOCUMENTS 4,809,170 A * 2/1989 Leblang .................... G06F 8/71
707/999.202
5,553,235 A * 9/1996 Chen ................... G06F 11/2294
714/20
(Continued)

OTHER PUBLICATIONS

Isil Dilling et al., The Closer: Automating Resource Management in Java, Jun. 2008, [Retrieved on Nov. 19, 2015]. Retrieved from the internet: <URL: http://dl.acm.org/citation.cfm?id=1375636> 10 Pages (1-10).*
(Continued)

*Primary Examiner* — Anibal Rivera (57) ABSTRACT

A method performed by a computing system includes: with a resource monitoring module, providing to a code transformation module, a set of references to methods within a source code, the methods comprising code associated with a resource, with the code transformation module, creating a modified source code by inserting new code into the source code, the new code to close the resource at the end of each method referenced by the set of references, compiling the modified source code to create an application, with the resource monitoring module, during execution of the application, determining that an exception has occurred as a result of an attempt to access the resource when the resource is closed, and with the resource monitoring module, updating the set of references to include a new reference to a new method, the new method corresponding to the exception.

14 Claims, 5 Drawing Sheets

(51) Int. Cl.
*G06F 9/44* (2018.01)
*G06F 9/46* (2006.01)
*G06F 9/445* (2018.01)
*G06F 8/41* (2018.01)
*G06F 8/51* (2018.01)
*G06F 9/455* (2018.01)
*G06F 11/30* (2006.01)
*G06F 9/50* (2006.01)

(52) U.S. Cl.
CPC ........ G06F 11/30 (2013.01); G06F 17/30348 (2013.01); *G06F 8/41* (2013.01); *G06F 8/433* (2013.01); *G06F 8/4432* (2013.01); *G06F 9/5016* (2013.01); *G06F 11/3688* (2013.01); *G06F 17/30058* (2013.01)

(58) Field of Classification Search
CPC ...... G06F 17/30634; G06F 9/465; G06F 9/52; G06F 9/3861; G06F 9/4425; G06F 9/5072; G06F 9/4435; G06F 11/2294; G06F 11/3616; G06F 11/3676; G06F 11/3688; G06F 11/36; G06F 11/0748
See application file for complete search history.

(56) References Cited

U.S. PATENT DOCUMENTS

| | | | | |
|---|---|---|---|---|
| 5,907,708 | A * | 5/1999 | Hohensee | G06F 9/3861 712/227 |
| 6,173,327 | B1 * | 1/2001 | De Borst | G06F 9/465 707/999.202 |
| 6,363,522 | B1 * | 3/2002 | Click, Jr. | G06F 8/4434 717/160 |
| 6,481,007 | B1 * | 11/2002 | Iyer | G06F 9/4484 717/151 |
| 6,487,716 | B1 * | 11/2002 | Choi | G06F 8/443 712/244 |
| 6,738,974 | B1 * | 5/2004 | Nageswaran | G06F 9/52 718/102 |
| 7,216,337 | B2 * | 5/2007 | Lambert | G06F 11/3688 714/E11.208 |
| 7,302,679 | B2 | 11/2007 | Chakrabarti et al. | |
| 7,512,935 | B1 | 3/2009 | Cobb | |
| 7,644,197 | B1 * | 1/2010 | Waldorf | G06F 9/524 710/105 |
| 7,756,968 | B1 | 7/2010 | Frey et al. | |
| 8,332,811 | B2 | 12/2012 | Festa | |
| 8,533,699 | B2 | 9/2013 | Moir et al. | |
| 8,578,339 | B2 | 11/2013 | Day et al. | |
| 8,713,547 | B2 | 4/2014 | Gschwind et al. | |
| 9,141,351 | B2 * | 9/2015 | Darcy | G06F 8/41 |
| 2001/0054022 | A1 * | 12/2001 | Louie | G06Q 40/00 705/38 |
| 2002/0059568 | A1 * | 5/2002 | Kawahito | G06F 8/443 717/151 |
| 2003/0140086 | A1 * | 7/2003 | Bollella | G06F 9/4812 718/108 |
| 2004/0019770 | A1 * | 1/2004 | Kawahito | G06F 8/4441 712/227 |
| 2004/0133628 | A1 * | 7/2004 | Bennett | G06F 17/30634 709/201 |
| 2004/0205725 | A1 * | 10/2004 | Lambert | G06F 11/3688 717/124 |
| 2005/0114843 | A1 * | 5/2005 | Gilgen | G06F 9/5016 717/127 |
| 2005/0262091 | A1 * | 11/2005 | Marvin | G06F 8/36 |
| 2006/0282828 | A1 * | 12/2006 | Mehta | G06F 9/4812 717/130 |
| 2006/0288025 | A1 * | 12/2006 | Kumar | G06F 8/316 |
| 2007/0124723 | A1 * | 5/2007 | Chapman | G06F 8/316 717/106 |
| 2008/0066063 | A1 * | 3/2008 | Pouliot | G06F 11/0748 717/177 |
| 2008/0140971 | A1 * | 6/2008 | Dankel | G06F 12/0284 711/163 |
| 2008/0282252 | A1 * | 11/2008 | Prasanna | G06F 9/5072 718/104 |
| 2009/0031292 | A1 * | 1/2009 | Fulton | G06F 9/4493 717/151 |
| 2009/0037873 | A1 * | 2/2009 | Ahadian | G06F 8/33 717/105 |
| 2009/0083271 | A1 * | 3/2009 | Day | G06F 17/30557 |
| 2009/0282475 | A1 * | 11/2009 | George | G06F 17/30058 726/21 |
| 2010/0198799 | A1 * | 8/2010 | Krishnan | G06F 11/3696 707/702 |
| 2010/0205578 | A1 * | 8/2010 | Barness | G06F 8/4432 717/100 |
| 2010/0235820 | A1 * | 9/2010 | Khouzam | H04N 21/4143 717/148 |
| 2011/0022551 | A1 * | 1/2011 | Dixon | G06F 11/3616 706/12 |
| 2011/0107297 | A1 * | 5/2011 | Chandra | G06F 8/433 717/110 |
| 2011/0258605 | A1 * | 10/2011 | Ioannou | G06F 8/77 717/126 |
| 2011/0307869 | A1 * | 12/2011 | Cwalina | G06F 8/447 717/127 |
| 2012/0054532 | A1 * | 3/2012 | Vecera | G06F 11/3676 714/2 |
| 2013/0060732 | A1 * | 3/2013 | Plasek | G06F 17/30348 707/609 |
| 2013/0298105 | A1 * | 11/2013 | Darcy | G06F 8/41 717/114 |
| 2013/0298106 | A1 * | 11/2013 | Darcy | G06F 8/41 717/114 |
| 2013/0339313 | A1 * | 12/2013 | Blaine | G06F 17/30371 707/691 |
| 2014/0165035 | A1 * | 6/2014 | Campbell | G06F 8/72 717/121 |
| 2015/0019584 | A1 * | 1/2015 | Berg | G06F 17/30424 707/769 |
| 2015/0106348 | A1 * | 4/2015 | Kapur | G06F 11/36 707/703 |

OTHER PUBLICATIONS

PostSharp, Techinical White Paper: Producing High-Quality Software with Aspect-Oriented Programming, 2011, [Retrieved on Nov. 19, 2015]. Retrieved from the internet: <URL: http://www.postsharp.net>25 Pages (1-25).*

Isil Dillig et al., The Closer: Automating Resource Management in Java, 2008, [Retrieved on Apr. 10, 2018]. Retrieved from the internet: <URL: https://www.cs.utexas.edu/~isil/ismm08-talk.pdf> 119 Pages (1-119) (Year: 2008).*

Chien-Tsun Chen, Exception handling refactorings: Directed by goals and driven by bug fixing, Jan. 2008, [Retrieved on Apr. 10, 2018]. Retrieved from the internet: <URL: https://ac.els-cdn.com/S0164121208001714/1-s2.0-S0164121208001714-main.pdf?> 13 Pages (333-345) (Year: 2008).*

Andy Georges et al., *Method-Level Phase Behavior in Java Workloads*, Department of Electronics and Information Systems (ELIS), Ghent University St.-Pietersnieuwstraat 41, B-9000 Gent, Belgium, http://buytaert.net/files/oopsla04-paper.pdf , Oct. 24-28, 2004.

Paolo Bellavista et al., *How to Monitor and Control Resource Usage in Mobile Agent Systems*, DEIS—University of Bologna; Dip. Ingegneria—University of Ferrara, http://lia.deis.unibo.it/Staff/PaoloBellavista/papers/doa01.pdf.

Steve Souza, *JAMon (Java Application Monitor) Users Guide*, http://jamonapi.sourceforge.net/ , 2011.

* cited by examiner

RESOURCE CLOSING

BACKGROUND

The present disclosure relates generally to software development, and more particularly to methods and systems for effectively closing resources to increase the performance of computing systems.

Software programs regularly access various resources such as files, database connections, etc. The source code for such programs should properly close such resources to allow the resources to be used by other programs. The software developer who writes the source code should thus write the code to include the instructions that properly close an opened resource. But, software developers may sometimes overlook such steps. Thus, an application can reduce the efficient use of computing resources.

Various tools are available to a developer to help the developer remember to close resources. But, such techniques may impose various restrictions on the developer. Moreover, while such tools can help with future code to be written, they do not address previously written source code that omits the proper resource closing instructions. Moreover, such tools come with a learning curve that represents additional time for the developer to learn how to use the tools.

SUMMARY

According to one example, a method performed by a computing system, the computing system comprising a code transformation module and a resource monitoring module, includes: with the resource monitoring module, providing to the code transformation module, a set of references to methods within a source code, the methods comprising code associated with a resource, with the code transformation module, creating a modified source code by inserting new code into the source code, the new code to close the resource at the end of each method referenced by the set of references, compiling the modified source code to create an application, with the resource monitoring module, during execution of the application, determining that an exception has occurred as a result of an attempt to access the resource when the resource is closed, and with the resource monitoring module, updating the set of references to include a new reference to a new method, the new method corresponding to the exception.

A method performed by a computing system includes with a code transformation module of the computing system, receiving a source code, the source code including code that accesses a resource, receiving, from a resource monitoring module, a set of references to methods within the source code that utilize the resource, and creating a modified source code by inserting code into the source code that closes the resource at an end of each method referenced by the set of references.

A computer program product stored on a non-transitory medium, the computer program product comprising a set of machine readable instructions that when executed by a processor, cause a computing system to: provide a set of references to methods within a source code, the methods utilizing a resource, create a modified source code by inserting new code into the source code, the new code to close the resource at the end of each method referenced by the set of references, compile the modified source code to create an application, during execution of the application, determine that an exception has occurred as a result of an attempt to access the resource when the resource is closed, and update the set of references to include a new reference to a new method, the new method corresponding to the exception.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, various tools are available to a developer to help the developer remember to close resources. But, such techniques may impose various restrictions on the developer. Moreover, while such tools can help with future code to be written, they do not address previously written source code that omits the proper resource closing instructions. Moreover, such tools come with a learning curve that represents additional time for the developer to learn how to use the tools.

According to principles described herein, a running application is monitored to determine when resources should be closed. Then, the original source code is modified based on information collected from monitoring the application so as to properly close those resources. The application is then compiled, executed, and again monitored. If an exception occurs related to an attempt to access an unopened resource, then this information is used to further modify the original source code. This process may be repeated until there are no more issues related to unclosed resources or attempts to access closed resources. The following describes such a method of source code modification for resource closing in greater detail.

Figure 1:
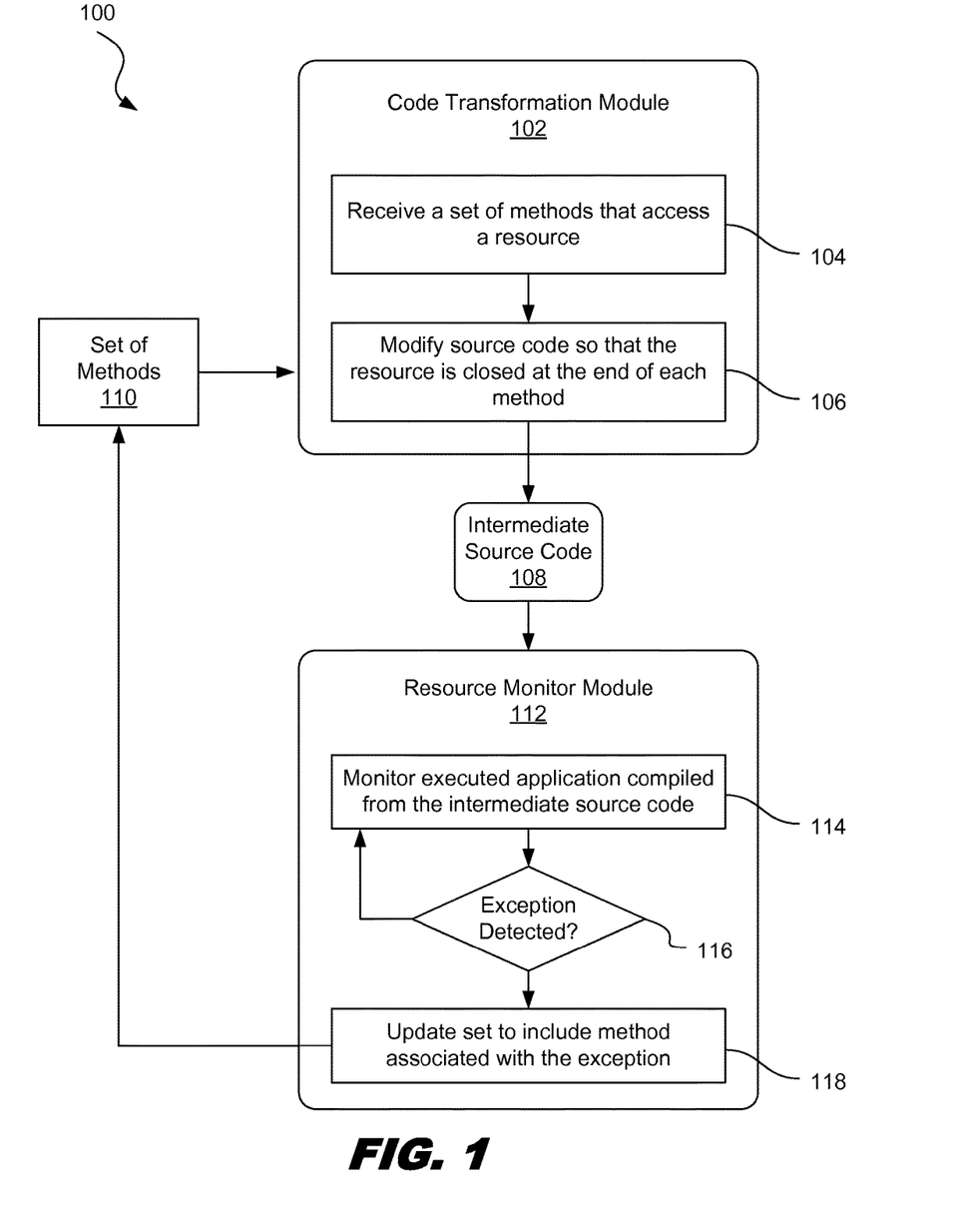
FIG. 1 is a diagram showing an illustrative flowchart for modifying source code to properly close resources, according to one example of principles described herein.

FIG. 1 is a diagram showing an illustrative flowchart for modifying source code to properly close resources. According to the present example, the method is performed by a code transformation module 102 and a resource monitor module 112. The code transformation module includes the software, hardware, or combination of both that performs computing tasks associated with transforming source code. The resource monitor module 112 includes the software, hardware, or combination of both that performs the computing tasks associated with monitoring a running application to collect information to be used by the code transformation module 102.

The code transformation module 102 is specific to a particular type of resource. For example, to transform source code to close Java Database Connection (JDBC) resources that were not properly closed, a code transformation module specific to JDBC is used. Likewise, to transform source code to close file access resources that were not properly closed, a code transformation module specific to file access resources is used. Thus, while only a single code transformation module 102 is illustrated in FIG. 1, it is understood that a method utilizing principles described herein may have multiple code transformation modules for different kinds of resources used by the source code.

According to the present example, the method 100 includes a step 104 for receiving a set of methods that access a resource. The resource is a specific resource associated with the code transformation module 102. More specifically, the set of methods is a set of references to methods within the source code that access the resource. The set may be obtained by analyzing the source code itself. For example, the source code may be parsed and all methods that include a call to open the resource can be added to the set of methods.

The method 100 further includes a step 106 for modifying the source code so that the resource is closed at the end of each method. In other words it is ensured that the resource used by that method is properly closed before the method returns to the point in the code that calls the method. More detail on how this modification is performed is discussed below with the text accompanying FIG. 3.

The code transformation module 102 produces an intermediate source code 108. It is referred to as such because it is a modified form of the original source code but it does not necessarily represent the final source code. The intermediate source code 108 is then compiled into an executable application. In some examples, the modification performed by the code transformation module occurs at compile time. After the intermediate source code has been compiled into an executable application, it is then executed.

According to the present example, the method 100 includes a step for monitoring the executed application that was compiled from the source code. Specifically, at step 116, the resource monitor module looks for exceptions related to attempts to access to a resource that has been closed. Due to the code transformation described above, this exception may occur for reasons that will be discussed below in the text accompanying FIG. 4. An exception is an event that occurs during runtime that can be handled by an exception handler. For example, an exception handler may be configured to open the resource that the code had attempted to access. But, it is desirable to fix this issue in the source code so as to have the application run more efficiently by not having to use the exception handler.

If no exception occurs, then the resource monitor module 112 continues to monitor the running application. In one example, while testing the running application, the inputs to the application may be automated to cause the program to step through each part of the source code that is to be monitored. For example, a set of automated inputs may be designed to cause the program to reach every piece of source code that calls a particular resource to ensure that no exceptions arise related to that resource.

If an exception does in fact occur, then at step 118, the set of methods 110 is updated to include the method that caused the exception. More specifically, a reference to the method that caused the exception is added to the references of methods within the set 110. As will be described in further detail below, the method added to the set of methods 110 likely calls a method within the set of methods 110.

After the resource monitor module completes the monitoring process, the code transformation module 102 then utilizes the updated set of methods 110 to further modify the source code. The process then repeats for each type of resource utilized by the code and until no exceptions related to closed resources are found. Then, a final piece of source code is output. This final piece of source code can then be compiled into an executable application and deployed as normal. After having the above process applied to create the final piece of source code, the application compiled therefrom will operate more efficiently and will allow the resources used by that application to be freed more quickly.

Figure 2:
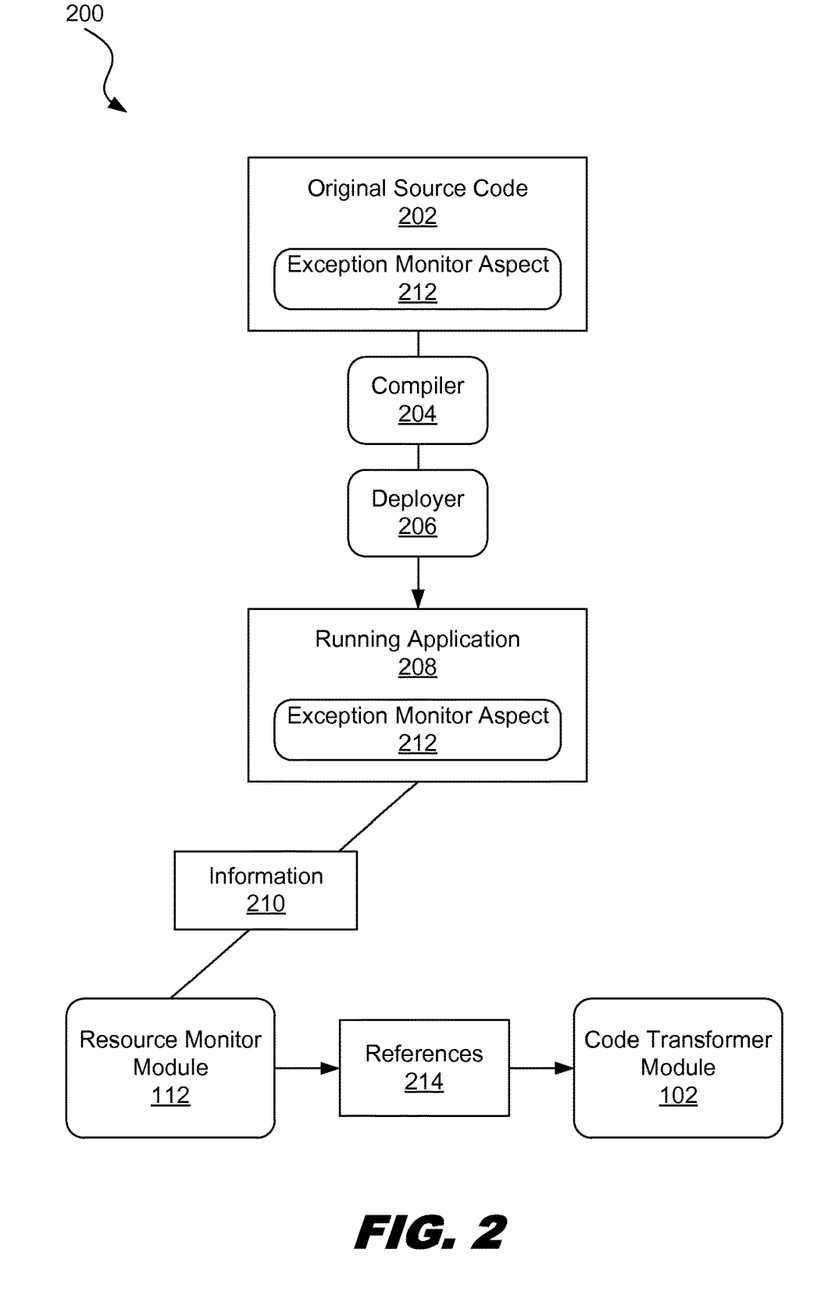
FIG. 2 is diagram showing illustrative operation of a resource monitor module used for source code modification, according to one example of principles described herein.

FIG. 2 is diagram showing illustrative operation of a resource monitor module used for source code modification. According to the present example, the source code being transformed utilizes Aspect Oriented Programming (APO) techniques. APO is a programming paradigm having the goal of modularizing tasks. A particular, modularized task is referred to as an aspect. In the present example, the resource monitoring module inserts an exception monitor aspect into the original source code 202. This is done before the source code is compiled.

The exception monitor aspect 212 includes the code that causes the program to look for exceptions. Specifically, the exception monitor aspect 212 looks for exceptions caused by an attempted access to a closed resource. If such an exception occurs, the exception monitor aspect will note the method being executed as the exception occur and output that method for use by the code transformation module (102, FIG. 1).

After the code for the exception monitor aspect 212 has been added to the original source code 202, the original source code is sent to a compiler 204 to be compiled. Thus, the code forming the exception monitor aspect is compiled into executable code along with the rest of the original source code 202. The compiled program is then sent to the deployer 206 where the program is executed.

While the application 208 is running, the exception monitor aspect 212 that was installed will perform its function and monitor the application for exceptions related to attempted access to a closed resource. The exception monitor aspect 212 collects such data 210 on behalf of the resource monitor module 112. The resource monitor module 112 can then package that data 210 for use by the code transformation module 102. As described above, this data 210 includes the class or method names, that when executed, cause the exceptions. The data 210 may also include other information that may be helpful to the resource monitor module 112. As described above, the resource monitor module 112 can then send the references 214 of the methods and classes to the code transformation module 102. The code transformation module 102 can then use that information to appropriately modify the source code.

Figure 3:
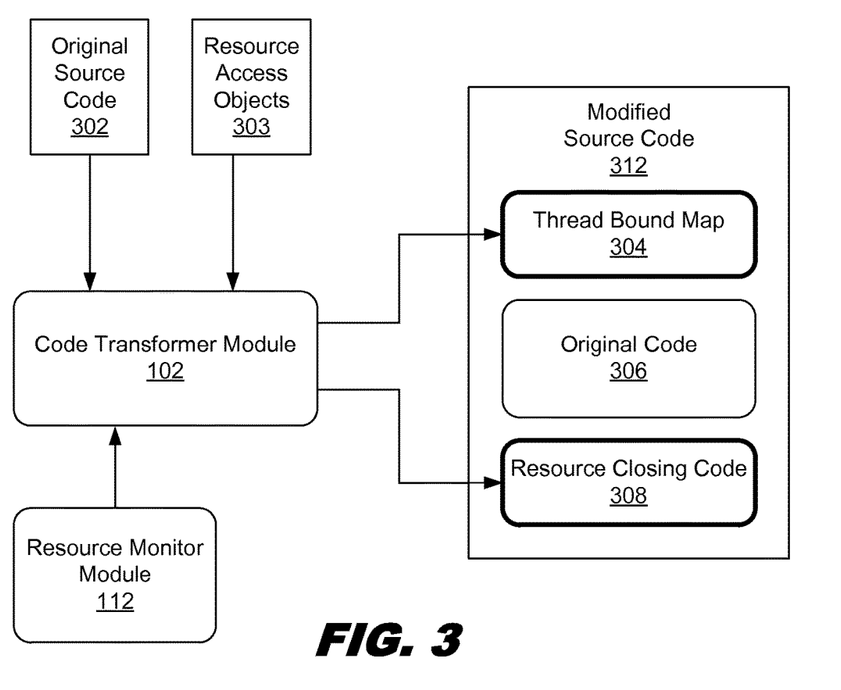
FIG. 3 is a diagram showing illustrative operation of a code transformation module used for source code modification, according to one example of principles described herein.

FIG. 3 is a diagram showing illustrative operation of a code transformation module 102 used for source code modification. According to the present example, the code transformation module 102 receives three inputs: the original source code 302, a list of resource access objects 303 that are to be closed, and data from the resource monitor module 112. The code transformation module 102 outputs modified source code 312, either in intermediate or final form.

The resource access objects 303 are the objects that open or access a particular resource. A list of the resource access objects 303 can be determined by analyzing the original source code for lines of code that include the resource access objects 303. The code transformation module 102 then uses the list of resource access objects 303 to install a thread bound connection map 304 into the modified source code 312. The thread bound connection map 304 correlates the resource access objects 303 to the current thread. During execution of the application, as resources are opened, they are added to the thread bound connection map 304 and associated with the methods that use those resources. The thread bound connection map 304 can thus be referenced when deciding the appropriate place to close a resource.

The code transformation module 102 proceeds through the list of methods and class names provided by the resource monitor module 112 and makes adjustments to the source code to close resources that have been left open. Thus, the modified source code includes 312 includes the thread bound connection map 304 and resource closing code 308 in addition to the original source code 306.

The resource closing code 308 provides the lines of code to properly shut down a resource that was not closed properly in the original code. The resource closing code can utilize the associations in the thread bound connection map 304 to properly close down a resource. The manner in which a resource is closed depends on the type of resource.

Figure 4:
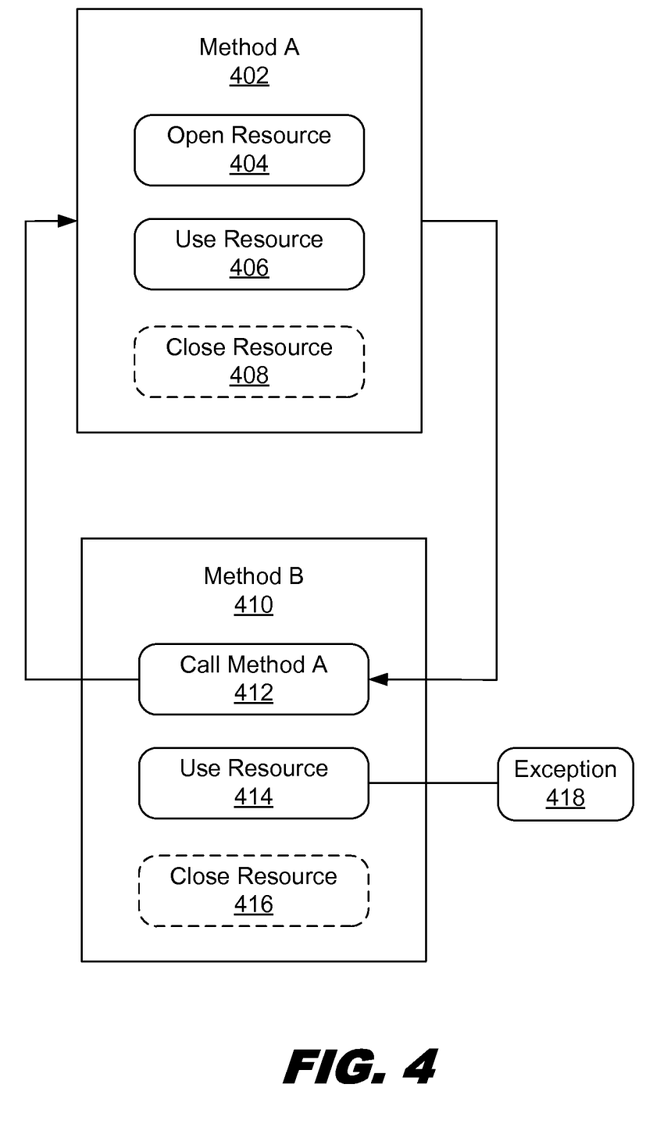
FIG. 4 is a diagram showing placement of resource closing code, according to one example of principles described herein.

FIG. 4 is a diagram showing placement of resource closing code. FIG. 4 illustrates components of a first method, Method A 402 and a second method, Method B 410. Method A includes code 404 to open a resource and code 406 that uses that resource. According to the present example, using principles described above, code 408 is inserted into method A to close the resource.

Then, as the resource monitor module (e.g. 112, FIG. 1) monitors the application, it finds an exception during execution of method B 410. Specifically, method B includes code 412 that calls method A. During the call to method A, the resource is opened, used, and then closed. Then, after returning to method B, there is code 414 that attempts to use the resource. But, because code 408 was inserted into method A to close the resource, an exception 418 will be thrown as there is an attempt to access the closed resource.

The resource monitor module then provides this information to the code transformation module (e.g., 102, FIG. 1) so that on the next iteration, the code transformation module can further modify the code to avoid the exception 418. Specifically, the code transformation module can remove the code 408 that closes the resource at the end of method A 402. And, in some examples, the code transformation module adds code 416 to the end of method B 410 to close the resource. FIG. 4 illustrates one example of how code can be modified to properly close resources and avoid exceptions. Different pieces of source code may involve other ways to handle such scenarios.

Figure 5:
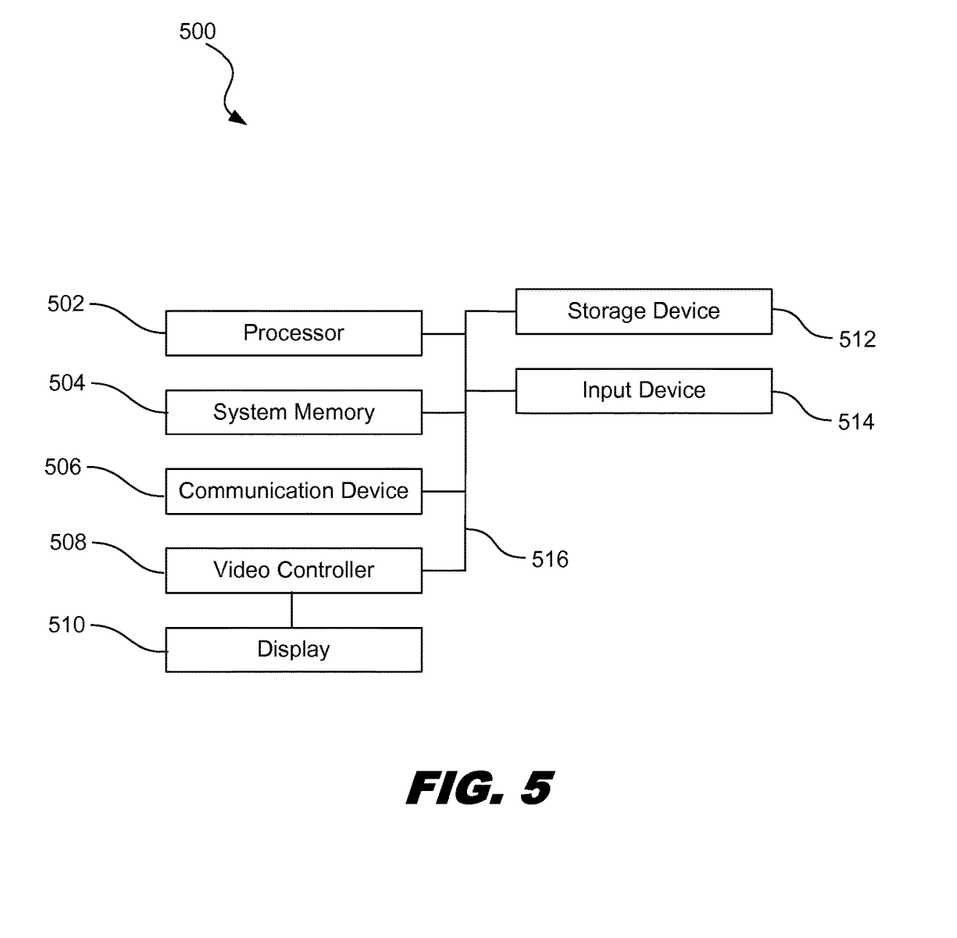
FIG. 5 is a diagram showing an illustrative computing system that may perform source code modification to close resources, according to one example of principles described herein.

FIG. 5 is a diagram showing an illustrative computing system that may perform source code modification to close resources. According to the present example, the computing system 500 includes a processor 502, an input device 514, a storage device 512, a video controller 508, a system memory 504, a display 510, and a communication device 506, all of which are interconnected by one or more buses 516.

The storage device 512 may include a computer readable medium that can store data. The storage device 512 may include volatile memory storage devices such as Random Access Memory (RAM) as well as non-volatile memory storage devices such as solid state memory components. The computer readable medium may be a non-transitory tangible media.

In some examples, the communication device 506 may include a modem, network card, or any other device to enable the computing system 500 to communicate with other computing devices. In some examples, any computing device represents a plurality of interconnected (whether by intranet or Internet) computer systems, including without limitation, personal computers, mainframes, PDAs, smart-phones and cell phones.

A computing system such as the computing system 500 typically includes at least hardware capable of executing machine readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, personal digital assistants (PDAs), or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary embodiments of the present disclosure may be embodied in the RAM of a computing device to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof, may be designed to work on any specific architecture. In some examples, one or more portions of the network may be executed on a single computer, local area networks, client-server networks, wide area networks, internets, handheld and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 504, and/or any combination thereof, may be executed by a processor 502 to cause the processor 502 to carry out or implement in whole or in part the operation of the computing system 500, one or more of the methods. In some examples, such a processor 502 may execute the plurality of instructions in connection with a virtual computer system.

Some examples of processing systems described herein may include non-transitory, tangible, machine readable media that include executable code that when run by one or more processors (e.g., processor 502) may cause the one or more processors to perform the processes of methods as described above. Some common forms of machine readable media that may include the processes of methods for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/ or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A computing system comprising a code transformation module that is specific to a particular type of resource within a source code and a resource monitoring module, the computing system comprising:
   a processor and memory with machine readable instructions that when executed by the processor, cause the system to:
   with the resource monitoring module, provide to the code transformation module, a set of references to methods, the methods comprising code associated with a resource, wherein the methods are within the source code, and the set of references is outside the source code, the set of references obtained by parsing all methods that include a call to open the resource;
   with the code transformation module, automatically create a modified source code by inserting new code into the source code, the new code to close the resource at the end of each method referenced by the set of references;
   iteratively perform the following until exceptions are no longer triggered resulting from attempts to access unclosed resources:
      compile the modified source code to create an executable application;
      with the resource monitoring module, during execution of the application, determine that an exception has occurred as a result of an attempt to access the resource when the resource is closed due the new code inserted in the source code;
      with the resource monitoring module, update the set of references to include a new reference to a new method in the set of references, the new method corresponding to the method causing the exception; and
      with the code transformation module, remove code that closes the resource from the method in which the exception occurred; and
   after exceptions are no longer triggered resulting from attempts to access unclosed resources, output a final source code to be compiled and deployed.

2. The computing system of claim 1, wherein the modifying the source code is done during the compiling.

3. The computing system of claim 1, wherein the new method calls a method referenced by a reference of the set of references.

4. The computing system of claim 1, wherein the resource is one of: a file, a Java Database Connectivity (JDBC) connection, or a Java Message Service (JMS).

5. The computing system of claim 1, further comprising, with the code transformation module, create a thread bound connection map that associates a resource access object for the resource with a current thread.

6. The computing system of claim 5, wherein the modifying the source code utilizes the thread bound connection map.

7. The computing system of claim 1, wherein the code transformation module is specific to a type of resource.

8. The computing system of claim 1, further comprising, with additional code transformation modules specific to additional types of resources, further modify the code to close the additional types of resources.

9. A method performed by a computing system, the method comprising:
   with a code transformation module of the computing system, receiving a source code, the source code including code that accesses a resource, the code transformation module being specific to a particular type of resource within a source code;
   receiving, from a resource monitoring module, a set of references to methods that utilize the resource, wherein the methods are within the source code, and the set of references is outside the source code, the set of references obtained by parsing all methods that include a call to open the resource;
   automatically creating a modified source code by inserting code into the source code that closes the resource at an end of each method referenced by the set of references;

iteratively performing the following until exceptions are no longer triggered resulting from attempts to access unclosed resources:
  compiling the modified source code to create an executable application;
  with the resource monitoring module, during execution of the application, determining that an exception has occurred as a result of an attempt to access the resource when the resource is closed due the new code inserted in the source code;
  with the resource monitoring module, updating the set of references to include a new reference to a new method in the set of references, the new method corresponding to the method causing the exception; and
  with the code transformation module, removing code that closes the resource from the method in which the exception occurred; and
after exceptions are no longer triggered resulting from attempts to access unclosed resources, outputting a final source code to be compiled and deployed.

10. The method of claim 9, further comprising, with the code transformation module, creating a thread bound connection map that associates a resource access object for the resource with a current thread.

11. The method of claim 10, wherein the modifying the source code utilizes the thread bound connection map.

12. The method of claim 9, wherein the source code embodies Aspect Oriented.

13. The method of claim 12, wherein the resource monitoring module utilizes a monitoring aspect.

14. A computer program product stored on a non-transitory medium, the computer program product comprising a set of machine readable instructions that when executed by a processor, cause a computing system to:

with a resource monitoring module, provide to the a code transformation module, a set of references to methods, the methods comprising code associated with a resource, wherein the methods are within a source code, and the set of references is outside the source code, the set of references obtained by parsing all methods that include a call to open the resource;

with the code transformation module, automatically create a modified source code by inserting new code into the source code, the new code to close the resource at the end of each method referenced by the set of references;

iteratively perform the following until exceptions are no longer triggered resulting from attempts to access unclosed resources:
  compile the modified source code to create an executable application;
  with the resource monitoring module, during execution of the application, determine that an exception has occurred as a result of an attempt to access the resource when the resource is closed due the new code inserted in the source code;
  with the resource monitoring module, update the set of references to include a new reference to a new method in the set of references, the new method corresponding to the method causing the exception; and
  with the code transformation module, remove code that closes the resource from the method in which the exception occurred; and
after exceptions are no longer triggered resulting from attempts to access unclosed resources, output a final source code to be compiled and deployed.

* * * * *